US012737365B2

(12) United States Patent
Thunuguntla et al.

(10) Patent No.: US 12,737,365 B2
(45) Date of Patent: Sep. 15, 2026

(54) REAL TIME PROCESSING FOR AGGREGATES

(71) Applicant: Intuit Inc., Mountain View, CA (US)

(72) Inventors: Saikiran Sri Thunuguntla, Bengaluru (IN); Chandarasekaran Myilsamy, Coimbatore (IN); Ajit Manoj Mujumdar, Vadodara (IN); Poonam Mishra, Phulnakhara (IN); Aveek Misra, Bengaluru (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/991,077

(22) Filed: Dec. 20, 2024

(65) Prior Publication Data

US 2026/0178588 A1 Jun. 25, 2026

(51) Int. Cl.
*G06F 16/215* (2019.01)
*G06F 16/2455* (2019.01)
*G06F 16/27* (2019.01)

(52) U.S. Cl.
CPC ...... *G06F 16/24556* (2019.01); *G06F 16/215* (2019.01); *G06F 16/278* (2019.01)

(58) Field of Classification Search
CPC ........ G06F 16/24; G06F 16/215; G06F 16/27; G06F 16/24556; G06F 16/278
See application file for complete search history.

(56) References Cited

U.S. PATENT DOCUMENTS 8,639,753 B1 * 1/2014 Meadows ............ H04L 65/765 709/223
10,122,783 B2 11/2018 Qiao et al.
10,445,332 B2 10/2019 Indyk et al.
10,528,367 B1 1/2020 Liu et al.
11,190,562 B2 11/2021 Feinstein
2010/0161362 A1 6/2010 Shapira et al.
2018/0052898 A1 * 2/2018 Allan .................... G06F 16/435
2018/0089276 A1 3/2018 Victor et al.
2018/0253434 A1 * 9/2018 Johnson ................ G06F 16/214
2021/0110328 A1 4/2021 Hsiao et al.
2021/0349898 A1 * 11/2021 Schuerings ........... G06F 16/182
2021/0373914 A1 12/2021 Hoh et al.
2022/0245033 A1 * 8/2022 Zou ..................... G06F 11/1464

OTHER PUBLICATIONS

"Apache Druid", visited Nov. 20, 2024, https://druid.apache.org.
"Apache Pinot", visited Nov. 20, 2024, https://pinot.apache.org.

* cited by examiner

*Primary Examiner* — Maher N Algibhah
(74) *Attorney, Agent, or Firm* — Paradice & Li LLP

(57) ABSTRACT

Systems and methods for determining attribute aggregations in a stream processing system uses a distributed ingestion service that ingests a data stream by deduplicating the data to extract only the most receipt domain events and selecting fields that are required for the attribute aggregation to reduce the amount of data that is written to a distributed database. Selected fields are written to multiple partitions in folders on a network storage device and uploaded in a bulk import to a distributed database that is partitioned based on primary keys. Read queries are executed by a distributed query service by reading data from the distributed database. The data is filtered based on primary keys. If multiple versions of data are present in the distributed database, the data is deduplicated and the attribute aggregations are determined before publishing the data in response to the queries.

28 Claims, 7 Drawing Sheets

REAL TIME PROCESSING FOR AGGREGATES

TECHNICAL FIELD

This disclosure relates generally to stream processing of data, and more particularly, to stream processing of data for real-time for data aggregation.

DESCRIPTION OF RELATED ART

Organizations increasingly rely on accurate data to inform and support data-driven decision-making. Data may be generated from a range of sources in continuous streams. To effectively use this data, organizations may ingest and analyze it in real time using stream processing. Unlike batch processing, which collects and processes large discrete chunks of data at scheduled intervals, stream processing continuously collects and processes data. Stream processing, for example, collects data from various sources, e.g., from servers, internal or external systems, applications, security logs, etc., and processes the streams of data as they are received, involving a series of operations such as filtering, transforming, and aggregating the data. Large volumes of data that are updated frequently may be handled by stream processing enabling organizations to analyze a wide range of customer and business activities. By way of example, stream processing may be used to monitor track and respond to customer behavior, track and manage inventory, monitor patient health in real time, conduct clinical risk assessments, monitor and respond to possible fraudulent activity, etc.

Stream processing may be used to create real-time pipelines to derive real-time aggregates. An aggregate (or aggregation) is a grouping of data by a common attribute generated using a function that combines smaller components into a large composition clustered around the attribute, which is specified by the user. A separate real-time pipeline may be used for each real-time aggregate that is required by the specified attribute. This approach, however, results in various complexities to the system. For example, redundant pipelines are needed for the same source of data across different customers, along with increased pipeline maintenance overheads and state management overload to handle stateful aggregates. Additional disadvantages include prolonged onboarding timelines for new entities and lower developer productivity due to redundant code creation that results from specifying attributes to be aggregated. Additionally, the correction of erroneous aggregates is difficult with separate real-time pipelines for each real-time aggregate. Accordingly, improvements to real-time aggregation in stream processing are desirable.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

As discussed herein, a stream processing system configured for attribute aggregation is configured to ingest a data stream by deduplicating the data to extract only the most receipt domain events and selecting fields that are required for the attribute aggregation to reduce the amount of data that is written to a distributed database. The selected fields from the most recent domain events are written to multiple partitions in folders on a network storage device and uploaded in a bulk import into a distributed database that is partitioned based on primary keys. Read queries are executed by a distributed query service by reading data from the distributed database based on the primary keys. The data is filtered based on primary keys and other attributes, such as time of ingestion and may be deduplicated if multiple versions of the data are present in the distributed database to increase the query speed. The attribute aggregations are determined and publishing the data in response to the queries.

One innovative aspect of the subject matter described herein can be implemented in a method for determining attribute aggregations in a stream processing system. The method includes receiving a stream of data over a communications network from one or more sources. The includes domain events associated with a plurality of primary keys, where each domain event includes one or more attributes. The data is ingested with a distributed ingestion service. The ingestion of the data includes deduplicating the data to extract only a most recent domain event for each primary key and selecting for ingestion only fields in the most recent domain event for each primary key that are required for determining attribute aggregations. The ingestion of the data additionally includes writing selected fields from the most recent domain event for each primary key to multiple partitions in folders on a network storage device and uploading the selected fields from the most recent domain event for each primary key in a bulk import into a distributed database partitioned based on primary keys. Read queries are executed by a distributed query service by reading data from the distributed database based on the primary keys and the attribute aggregations are determined from the data and published in response to one or more queries.

One innovative aspect of the subject matter described herein can be implemented as a system for determining attribute aggregations. The system includes one or more processors, and at least one memory coupled to the one or more processors and storing instructions that, when executed by the one or more processors, cause the system to perform operations. Example operations include receiving a stream of data over a communications network from one or more sources. The data includes domain events associated with a plurality of primary keys, and each domain event includes one or more attributes. The data is ingested with a distributed ingestion service. Ingesting the data includes deduplicating the data to extract only a most recent domain event for each primary key and selecting for ingestion only fields in the most recent domain event for each primary key that are required for determining attribute aggregations. Ingesting the data further includes writing selected fields from the most recent domain event for each primary key to multiple partitions in folders on a network storage device and uploading the selected fields from the most recent domain event for each primary key in a bulk import into a distributed database partitioned based on primary keys. Operations further include executing read queries by a distributed query service by reading data from the distributed database based on the primary keys and determining and publishing the attribute aggregations from the data in response to one or more queries.

One innovative aspect of the subject matter described herein can be implemented as a non-transitory computer-readable medium storing instructions that, when executed by one or more processors of a system for determining attribute aggregations, cause the system to perform operations. Example operations include receiving a stream of data over a communications network from one or more sources. The data includes domain events associated with a plurality of primary keys, and each domain event includes one or more attributes. The data is ingested with a distributed ingestion service. Ingesting the data includes deduplicating the data to extract only a most recent domain event for each primary key and selecting for ingestion only fields in the most recent domain event for each primary key that are required for determining attribute aggregations. Ingesting the data further includes writing selected fields from the most recent domain event for each primary key to multiple partitions in folders on a network storage device and uploading the selected fields from the most recent domain event for each primary key in a bulk import into a distributed database partitioned based on primary keys. Operations further include executing read queries by a distributed query service by reading data from the distributed database based on the primary keys and determining and publishing the attribute aggregations from the data in response to one or more queries.

One innovative aspect of the subject matter described herein can be implemented in a method for determining attribute aggregations in a stream processing system. The method includes receiving queries for attribute aggregations of data streamed over a communications network. The includes domain events associated with a plurality of primary keys, where each domain event includes one or more attributes and is stored in distributed database partitioned based on primary keys. The queries are executed by a distributed query service. Execution of the queries includes reading the data from the distributed database based on the primary key and filtering the data based on a time of ingestion of the data to select only attributes updated within a user defined amount of time. Execution of the queries further includes deduplicating filtered data when multiple versions are present to extract only most recent attribute values for each primary key and determining the attribute aggregations for deduplicated and filtered data. The attribute aggregations are published in response to the queries.

One innovative aspect of the subject matter described herein can be implemented as a system for determining attribute aggregations. The system includes one or more processors, and at least one memory coupled to the one or more processors and storing instructions that, when executed by the one or more processors, cause the system to perform operations. Example operations include receiving queries for attribute aggregations of data streamed over a communications network. The data includes domain events associated with a plurality of primary keys, and each domain event includes one or more attributes and is stored in distributed database partitioned based on primary keys. The queries are executed by a distributed query service. Execution of the queries includes reading the data from the distributed database based on the primary key and filtering the data based on a time of ingestion of the data to select only attributes updated within a user defined amount of time. Execution of the queries further includes deduplicating filtered data when multiple versions are present to extract only most recent attribute values for each primary key and determining the attribute aggregations for deduplicated and filtered data. The attribute aggregations are published in response to the queries.

One innovative aspect of the subject matter described herein can be implemented as a non-transitory computer-readable medium storing instructions that, when executed by one or more processors of a system for determining attribute aggregations, cause the system to perform operations. Example operations include receiving queries for attribute aggregations of data streamed over a communications network. The data includes domain events associated with a plurality of primary keys, and each domain event includes one or more attributes and is stored in distributed database partitioned based on primary keys. The queries are executed by a distributed query service. Execution of the queries includes reading the data from the distributed database based on the primary key and filtering the data based on a time of ingestion of the data to select only attributes updated within a user defined amount of time. Execution of the queries further includes deduplicating filtered data when multiple versions are present to extract only most recent attribute values for each primary key and determining the attribute aggregations for deduplicated and filtered data. The attribute aggregations are published in response to the queries.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Figure 1:
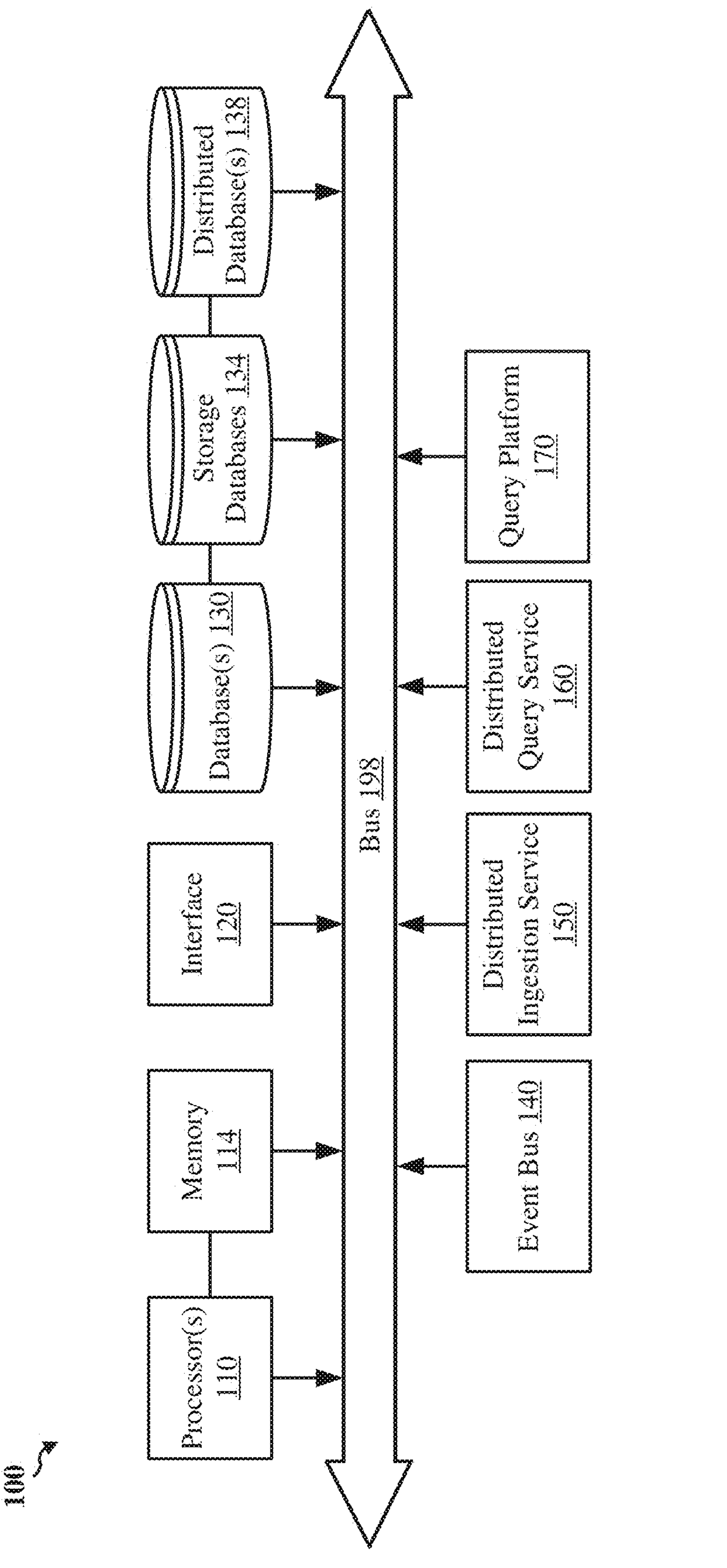
FIG. 1 illustrates a system configured for determining attribute aggregations in a data stream, according to some implementations.

As described above, organizations increasingly rely on accurate data to inform and support data-driven decision-making. Stream processing is used to collect and process large volumes of data in a continual and incremental manner. Stream processing is used to create real-time pipelines to derive real-time aggregates, which may be used to respond to user queries. An aggregate (or aggregation) is a grouping of data by a common attribute generated using a function that combines smaller components into a large composition clustered around the attribute, which is specified by the user. For example, a user, such as a member of a marketing team, may request information related to various customer attributes that may be ascertained from streaming data events. By way of illustration, customer attributes to be determined from the streaming data may be relatively simple, such as whether a customer has an application is enabled, the count of vendors created by a customer, the count of trips created by a customer. In other example, more complex attributes may include the number of entities/customers created within a particular time period, a count of categorized or uncategorized transactions, a number of active or inactive customers, a number of logins within a particular time period, a number of open invoices, etc.

Typically, to derive real-time aggregates in response to user queries, rolling window techniques are used, which requires management of state. With a large amount of data and attributes to be aggregated, the amount of state to be managed may be excessive. Further, a separate real-time pipeline is typically used for each real-time aggregate that is required by the specified attribute, which results in various complexities to the system, such as redundant pipelines, increased pipeline maintenance overheads, and state management overload, as well as prolonged onboarding timelines for new entities, lower developer productivity due to redundant code creation, and difficultly in correcting erroneous aggregates.

As discussed herein, a real time stream processing framework is used for computing aggregates with increased efficiency through intelligent data ingestion, data persistence, and data aggregation. For example, during data ingestion, the data is deduplicated and only fields that require aggregate computation are ingested. The data may be written to a distributed database that is partitioned based on primary key to increase the read efficiency and is processed by a query processor service to compute desired metrics without a need for state management. While computing aggregates, only aggregates for customers with new data are computed so that only little data is fetched while computing aggregates. Additionally, the query processor service uses a low code/no code approach so that developers only need to write configuration files and do not need to write code for their pipelines.

Various implementations of the subject matter disclosed herein provide one or more technical solutions to the technical problem of improving the functionality (e.g., speed, accuracy, etc.) of computer-based systems, where the one or more technical solutions can be practically and practicably applied to improve on existing techniques for data streaming and aggregation. Implementations of the subject matter disclosed herein provide specific inventive steps describing how desired results are achieved and realize meaningful and significant improvements on existing computer functionality—that is, the performance of computer-based systems operating in the evolving technological field of data streaming and aggregation.

FIG. 1 shows a system 100 configured for determining attribute aggregations in a data stream, according to some implementations. Various aspects of the system 100 disclosed herein are generally applicable for data stream processing and real-time data aggregation. The system 100 includes a combination of one or more processors 110, a memory 114 coupled to the one or more processors 110, an interface 120, one or more databases 130, storage database(s) 134, distributed database 138, one or more event buses 140, a distributed ingestion service 150, a distributed query service 160, and query platform 170. In some implementations, the various components of the system 100 are interconnected by at least a data bus 198. In some other implementations, the various components of the system 100 are interconnected using other suitable signal routing resources.

The processor 110 includes one or more suitable processors capable of executing scripts or instructions of one or more software programs stored in the system 100, such as within the memory 114. In some implementations, the processor 110 includes a general-purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In some implementations, the processor 110 includes a combination of computing devices, such as a combination of a DSP and a microprocessor, a plurality of microprocessors, one or more microprocessors in conjunction with a DSP core, or any other suitable configuration. In some implementations, the processor 110 incorporates one or more graphics processing units (GPUs) and/or tensor processing units (TPUs), such as for processing a large amount of data.

The memory 114, which may be any suitable persistent memory (such as non-volatile memory or non-transitory memory) may store any number of software programs, executable instructions, machine code, algorithms, and the like that can be executed by the processor 110 to perform one or more corresponding operations or functions. In some implementations, hardwired circuitry is used in place of, or in combination with, software instructions to implement aspects of the disclosure. As such, implementations of the subject matter disclosed herein are not limited to any specific combination of hardware circuitry and/or software.

The interface 120 is one or more input/output (I/O) interfaces for transmitting or receiving (e.g., over a communications network) transmissions, input data, and/or instructions to or from a computing device (e.g., of a user), outputting data (e.g., over the communications network) to the computing device of the user, providing a search and/or querying interface for the user, outputting query results to the computing device of the user, and the like. In some implementations, the interface 120 is used to initiate any one or more of an ingestion process, a query process, and the like. The interface 120 may also be used to provide or receive other suitable information, such as computer code for updating one or more programs stored on the system 100, internet protocol requests and results, or the like. An example interface includes a wired interface or wireless interface to the internet or other means to communicably couple with user devices or any other suitable devices. In an example, the interface 120 includes an interface with an ethernet cable to a modem, which is used to communicate with an internet service provider (ISP) directing traffic to and from user devices and/or other parties. In some implementations, the interface 120 is also used to communicate with another device within the network to which the system 100 is coupled, such as a smartphone, a tablet, a personal computer, or other suitable electronic device. In various implementations, the interface 120 includes a display, a speaker, a mouse, a keyboard, or other suitable input or output elements that allow interfacing with the system 100 by a local user or moderator.

The database 130 stores data associated with the system 100, such as source data, target data, indications, timestamps, events, parity results, algorithms, differential results, ambiguities, intersection results, repair values, data objects, algorithms, weights, models, modules, engines, user information, other values, ratios, historical data, recent data, current or real-time data, files, plugins, metadata, arrays, tags, identifiers, prompts, queries, replies, feedback, insights, formats, characteristics, and/or features, among other suitable information, such as in one or more JavaScript Object Notation (JSON) files, comma-separated values (CSV) files, or other data objects for processing by the system 100, one or more Structured Query Language (SQL) compliant data sets for filtering, querying, and sorting by the system 100 (e.g., the processor 110), or any other suitable format. In various implementations, the database 130 is a part of or separate from the storage databases 134, the distributed databases 138, and/or another suitable physical or cloud-based data store. In some implementations, the database 130 includes a relational database capable of presenting information as data sets in tabular form and capable of manipulating the data sets using relational operators.

The one or more storage databases 134 store data during ingestion. In some implementations, the storage database 134 includes one or more databases that can efficiently handle high-volume, short transactions, including data insertion, updating, and reading. In some implementations, the storage database 134 includes one or more network drives, blob storage, and Online Transaction Processing (OLTP) databases. Example OLTP sources include MySQL, Oracle, Postgres, SQL Server, DynamoDB, Amazon Web Services (AWS)-based EBS volumes or Simple Storage Service (S3), SFTP, Domain Events, IPS, Outbox Service, or any other suitable database that can be used for managing high-volume transactions, providing advanced security features, supporting complex queries, enabling data access, securing data transfer, and the like. In various implementations, the storage databases 134 may be a part of or separate from the database 130 and/or the distributed database 138. In some instances, the storage database 134 includes data stored in one or more cloud object storage services, such as one or more Amazon Web Services (AWS)-based Simple Storage Service (S3) buckets or EBS volumes. In some implementations, all or a portion of the data is stored in a memory separate from the storage database 134, such as in the database 130 and/or another suitable data store.

The distributed databases 138 stores data after ingestion. In some implementations, the distributed databases 138 includes one or more databases that can efficiently handle high-volume, short transactions, including data insertion, updating, and reading. The distributed databases 138 may be a massively parallel processing (MPP) data store, such as AWS Redshift. The distributed databases 138 may be an append only. The distributed databases 138 may be configured to store data partitioned based on primary key so that all data associated with a primary key is collocated. In various implementations, the distributed databases 138 may be a part of or separate from the database 130 and/or the storage database 134. In some implementations, all or a portion of the data is stored in a memory separate from the distributed database 138, such as in the database 130 and/or another suitable data store.

In some implementations, the one or more event buses 140 may include a source event bus or target event bus. The event buses 140 may be cluster based Apache Kafka-like systems that receive streaming data from one or more sources via the interface 120 and publishes the streaming data to the distributed ingestion service 150.

The distributed ingestion service 150 includes one or more ingestion adaptors to ingest the real-time messages into the distributed databases 138 in a scalable and fault-tolerant manner. The distributed ingestion service 150 includes deduplication logic for deduplicating data and selects fields in the data that are required for deriving the attribute aggregations based on query configurations. The distributed ingestion service 150 is configured for bulk pull and parallel processing to consume and transform complex data structures from the event buses 140 into simple flattened structures. The distributed ingestion service 150 is configured to write data to partitions in multiple local folders in a network drive, e.g., in storage databases 134. The distributed ingestion service 150 is further configured to read data from the network drive and upload data to blob storage, e.g., in storage databases 134, and to bulk import the data to the distributed databases 138. The distributed ingestion service 150 may be configured to use Java Database Connectivity (JDBC) connections or Amazon S3 COPY feature to allow for parallel data insertion into the distributed databases 138 and writes data to partitions based on primary key.

The distributed query service 160 is a distributed multi-threaded query service that assigns each thread with the task of handling aggregated queries for each table in the distributed database 138. The distributed query service 160 is configured to read and filter data from the distributed database based on query configurations. The distributed query service 160 is configured to deduplicate data if multiple versions of data associated with a primary key are stored in the distributed databases 138. The distributed query service 160 runs all threads simultaneously in parallel, performing aggregate computations and then transmitting the results downstream to a target event bus.

The query platform 170 enables users to define attribute aggregations to be computed using a low-code, no-code configuration based approach for managing the distributed ingestion service 150 and distributed query service 160. The query platform 170 enables domain events for ingestion to be defined during on boarding, along with the aggregates for each domain event that are to be determined, and for each aggregate, the column within the domain event that is used to determine the aggregate.

Figure 2:
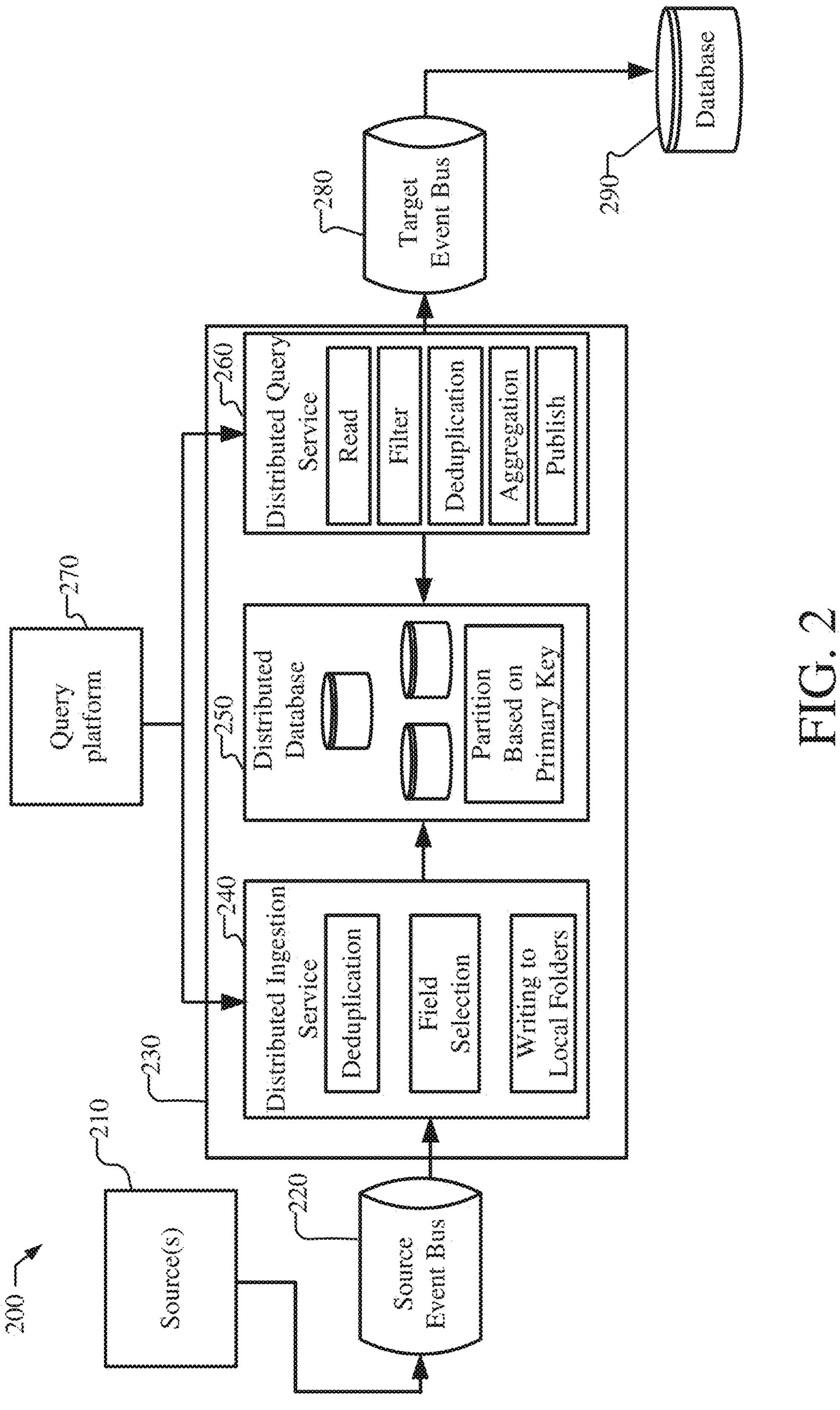
FIG. 2 shows a high-level overview of an example process flow employed by real-time stream processing architecture for computing attribute aggregations, according to some implementations.

FIG. 2 shows a high-level overview of an example process flow employed by real-time stream processing architecture 200 for computing attribute aggregations as discussed herein. In various implementations, the stream processing architecture 200, as illustrated, includes one or more data sources 210, a source event bus 220, a Hybrid Transactional Analytical Processor 230, a query platform 270, a target event bus 280, and storage 290. The Hybrid Transactional Analytical Processor 230 includes a distributed ingestion service 240, distributed database 250, distributed query service 260. In some implementations, various aspects of the stream processing architecture 200 are described with respect to FIG. 1.

As illustrated, the one or more data sources 210 publishes streaming data to a source event bus 220, which, for example, may be a cluster based Kafka-like system. The one or more data sources 210, for example, may be businesses or companies or any other source of data. In some implementation, each company may have multiple sub-entities, such as customers, vendors, etc. The data reported by the one or more data sources 210, for example, comprises domain events, e.g., such as transactions, invoices, reports, etc. that indicate a change in a domain, and is reported in a continuous or near continuous data stream. The data stream may include a large amount of data, e.g., as there may be multiple data sources, each reporting a large number of domain events, which may include multiple attributes, e.g., identified in multiple fields in the data.

The data stream is provided to a Hybrid Transactional Analytical Processor (HTAP) 230, which is configured to process and aggregate real-time data. In some implementations, the HTAP 230 has an aggregate processing framework to automatically generate attribute aggregations, and includes a distributed ingestion service 240, a distributed database 250, and a distributed query service 260. The distributed ingestion service 240 ingests the real-time data stream into the distributed database 250 in a scalable and fault-tolerant manner. The distributed ingestion service 240 may employ a deduplication process, field selection process, and may write data to partitions in multiple local folders. The distributed ingestion service 240, for example, employs a multithreaded approach to consume and transform complex data structures into simple flattened structures, which enables the processing and storage of a large number of messages, e.g., 10,000 messages per second, for each individual topic per thread. In some implementations, the distributed ingestion service 240 may use different protocols for topics with different amounts of events. For example, a Java Database Connectivity (JDBC) connection may be used for topics with less than 1.5 k transactions per second (TPS) and the Amazon S3 COPY feature may be used for topics with TPS of more than 1.5 k (up to 10 k TPS), thereby enabling parallel data insertion into the distributed database 250.

The distributed database 250 stores the ingested real-time data, e.g., domain events, as a native table in a distributed data store. The distributed database 250, for example, may be a massively parallel processing (MPP) data store, such as Amazon's Redshift. The distributed database 250 may be an append only database, i.e., ingested data is not merged in the distributed database 250, which improves write throughput. Each table within the distributed database 250 is designed with appropriate sorting and distribution keys to ensure that the rows in the table are evenly distributed across the compute nodes for MPP parallel processing. For example, the distributed database 250 stored data partitioned based on primary key so that all data associated with a primary key is collocated to improve query speed. When a query is triggered, the stream processing architecture 200 can seamlessly choose only the required relevant segments, enabling a faster processing time. The stream processing architecture 200, for example, may be capable of inserting a large amount of data per second, e.g., 150 MB of data per second, which amounts to 10 TB of data being stored per day.

The distributed query service 260 is configured to query the distributed database 250 efficiently, to generate real-time aggregates based on user requests, and to scale seamlessly in response to changes in load conditions. The distributed query service 260, for example, read and filters data from the append only distributed database 250 and may deduplicate data if multiple versions of data associated with a primary key is present. The distributed query service 260 is a multithreaded query service that assigns each thread with the task of handling aggregated queries for each table in the distributed data store. All threads run simultaneously in parallel, performing aggregate computations on the distributed data store and then publishing the results downstream to the target event bus 280, that for example, may be a cluster based Kafka-like system, and which writes the data to storage 290, which may be an online analytical processing (OLAP) database or Customer 360 (C360) database. The distributed query service 260 may be configured to handle a large number, e.g., approximately 100 queries per second, with each query fetching approximately 1 GB of data, resulting in a total data volume of 100 GB per second. The stream processing architecture 200 is built to handle such load with parallel processing techniques as discussed herein.

A user query platform 270, which allows users to define the attribute aggregations to be computed. Based on the attribute aggregations to be computed, the ingestion configuration is provided from the query platform 270 to the distributed ingestion service 240, and the query configuration is provided from the query platform 270 to the distributed query service 260. For example, through the user query platform 270 during on boarding, the domain events that are being ingested may be defined, along with the aggregates for each domain event that are to be determined, and for each aggregate, the column within the domain event that is used to determine the aggregate may be defined. The query platform 270 enables a low code, no code configuration based approach for managing the distributed ingestion service 240 and distributed query service 260.

In some implementations, the stream processing architecture 200 may include additional components, such as a data lake and managed cluster platform, such as Amazon EMR (previously called Amazon Elastic MapReduce) cluster, which may receive data, via the source event bus 220, and perform bootstrapping action to the distributed database 250.

As illustrated, in one implementation, the distributed ingestion service 240 employs deduplication to extract only a most recent domain event associated with each primary key, thereby increasing the write throughput by reducing the data written to the distributed database 250. The primary key is a unique identifier for each message and may be, for example, a company identifier (companyID), or in some implementations may include a combination of identifiers for multiple hierarchical entities, such as a company identifier and customer (or other entity) identifier. The primary key sometimes may be referred to herein as a company identifier or company/entity identifier, but it should be understood that the primary key is not limited thereto. For example, a batch of data provided to the distributed ingestion service 240 from the source event bus 220 may contain a large amount of data, e.g., 20,000 records, and multiple updated domain events may exist within the data for each primary key. Only the latest domain event is required for aggregate computation. The deduplication process is used to obtain only the latest domain event for each primary key thereby reducing the amount of data to be written to the distributed database 250. The deduplication process, for example, may be performed using a "group by" function on the primary key and retaining latest domain event. By performing deduplication of the data and inserting only the most recent data during ingestion, the insertion speed is enhanced, and query timing is reduced as there is less data to be read.

By way of example, Table 1 illustrates an input set of domain events associated with primary keys, which include a combination of identifiers for hierarchical entities including a company identifier ("C"), and an entity identifier ("E"), which may be a customer or other entity associated with the company identifier. It should be understood that while the primary key is illustrated as a combination of company and entity identifiers, the aggregation processing framework discussed herein is not so limited, and the data may be structured around any primary key. Table 1 illustrates the type of event, e.g., insert, update, or delete, along with the associated attribute and time stamp for each primary key, i.e., combination of customer/entity identifiers.

TABLE 1

| INPUT SET OF DOMAIN EVENTS |
|---|
| C1 - E1 - Type-Insert - <Attributes>-10Hr.20min.31sec.415 |
| C1 - E1 - Type-Update - <Attributes>-10Hr.20min.32sec.500 |
| C1 - E1 - Type-Update - <Attributes>-10Hr.20min.33sec.600 |
| C1 - E1 - Type-Update - <Attributes>-10Hr.20min.34sec.650 |
| C2 - E3 - Type-Update - <Attributes>-10Hr.20min.31sec.515 |
| C2 - E3 - Type-Update - <Attributes>-10Hr.20min.32sec.700 |
| C3 - E2 - Type-Update - <Attributes>-10Hr.20min.33sec.700 |
| C3 - E2 - Type-Update - <Attributes>-10Hr.20min.34sec.850 |

As illustrated in Table 1, the primary key C1-E1 has several events, including an insert and three updates, while primary keys C2-E3 and C3/E2 each have two updates. Table 2 illustrates the input set of events after deduplication performed during ingestion.

TABLE 2

| DEDUPLICATED DOMAIN EVENTS |
|---|
| C1 - E1 - Type-Update - <Attributes>-10Hr.20min.34sec.650 |
| C2 - E3 - Type-Update - <Attributes>-10Hr.20min.32sec.700 |
| C3 - E2 - Type-Update - <Attributes>-10Hr.20min.34sec.850 |

As illustrated in Table 2, using the deduplication logic in the distributed ingestion service 240, only the latest domain event for each primary key is retrained for aggregate computation, thereby significantly reducing the data to be written to the distributed database 250 and increasing the write throughput.

Additionally, during ingestion, the distributed ingestion service 240 employes field selection to select only the fields in each domain event that is required for deriving the attribute aggregations. The field selection, for example, may be used to select fields from the most recent domain event for each primary key, e.g., after deduplication or before deduplication. Each domain event may include a large number of fields and may include values for each field, but only a portion of the fields correspond to attributes that are to be aggregated. With field selection, only the fields that are required for aggregation are retained, thereby reducing the amount of data to be written to the distributed database 250.

The distributed ingestion service 240, for example, uses a parallel processing approach to consume data from Topics in the source event bus 220, e.g., Kafka Topics, and transforms complex messages into simple flattened messages, for a single message transfer. During the transformation, the distributed ingestion service 240 may perform field selection. The fields selected are based on the aggregates being computed and are defined during the self-serve onboarding process, e.g., via the query platform 270. Using field selection, the insertion speed to the distributed database 250 is improved, along with the query performance as the amount of data to be read is reduced, and the storage and computation time is reduced.

The distributed ingestion service 240 processes and groups the data to be written by primary key, e.g., the customer/entity pairs, which have high cardinality, for better read efficiency. Further, during ingestion, a partition key is generated based on the primary key, e.g., based on the customer identifier, and all data per Topic is written top the distributed database 250 based on the partition key, so that all data is collocated for a given partition key, which improves query speed, as the read queries have a better efficiency. One Topic may have multiple partitions and are read parallel from each partition and written to local folders, e.g., on a storage device, such as Amazon EBS volume.

Figure 3:
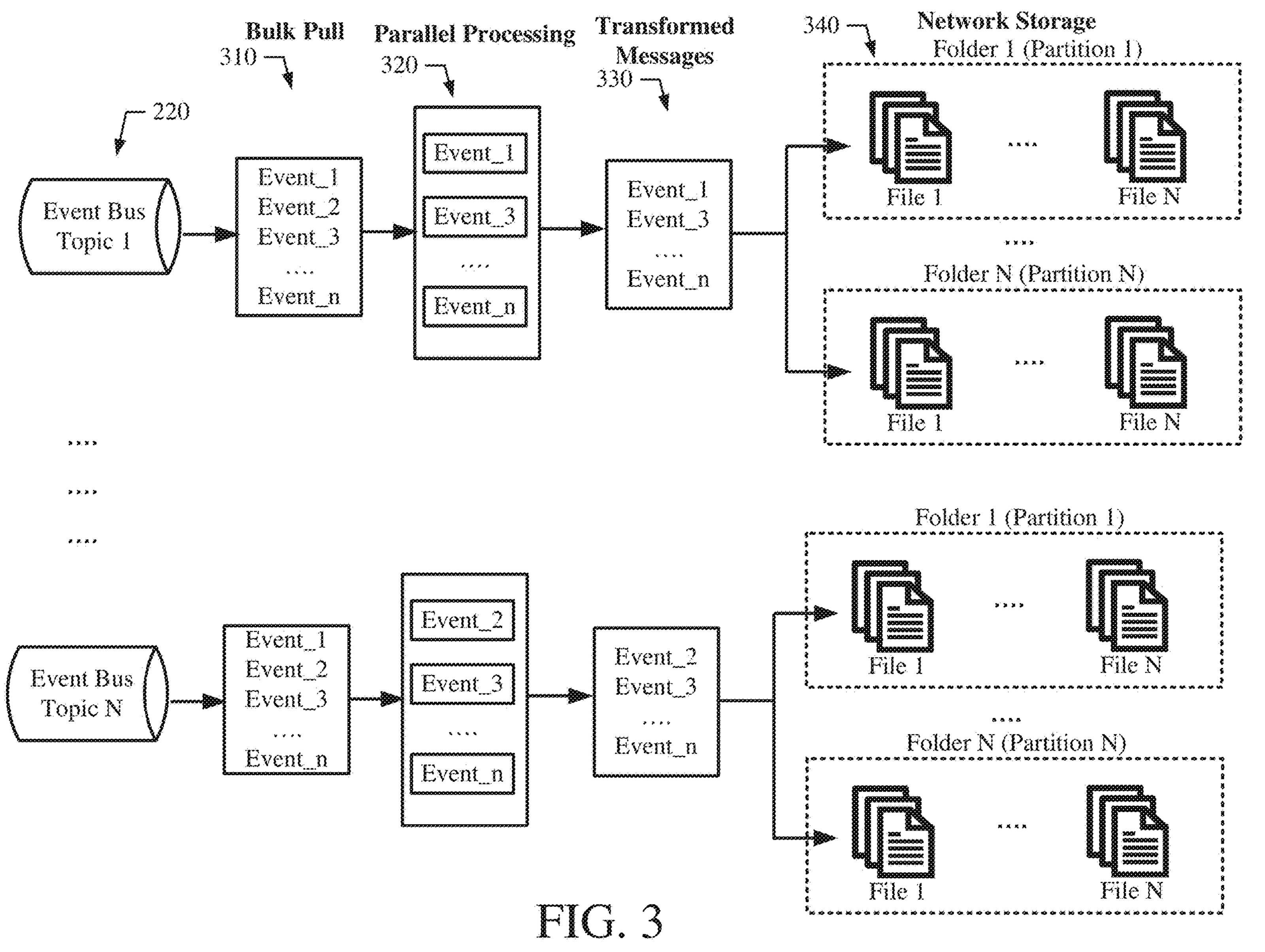
FIG. 3 shows a high-level overview of the ingestion process by the distributed ingestion service illustrated in FIG. 2.

FIG. 3, for example, shows a high-level overview of the ingestion process by the distributed ingestion service 240, including deduplication, parallel processing and writing the selected fields from the most recent domain events for each primary key to multiple partitions in folders on a storage device, e.g., a network storage device.

As illustrated, the source event bus 220 includes multiple parallel Topics, e.g. labeled Topic 1 . . . . Topic N. Various domain events may flow to respective topics. For example, customer domain events may flow in Topic 1, invoice domain events may flow to Topic 2, etc. Each Topic, for example, may be assigned to one or a set of partitions. The distributed ingestion service 240 performs a bulk pull 310 of the data for each Topic and deduplicates the data. For example, in Topic 1, Event_2 and Event_3 may be duplicates and in Topic N, Event_1 and Event_2 may be duplicates, and only the latest events, e.g., Event_3 in Topic 1 and Event_2 in Topic N are retained. As illustrated, the deduplicated data is processed in parallel 320 to consume the data and generate transformed messages 330, which are flattened messages. During the parallel processing to generate the transformed messages, field selection is employed so that only fields required for the computation of the required aggregates are selected. Dedicated folders in the network storage device are used for each partition. The data per each Topic is written 340 based on the partition key to corresponding dedicated local folder, e.g., in the storage device, in a file. As illustrated, each folder includes multiple files in which the stream data is written.

Figure 4:
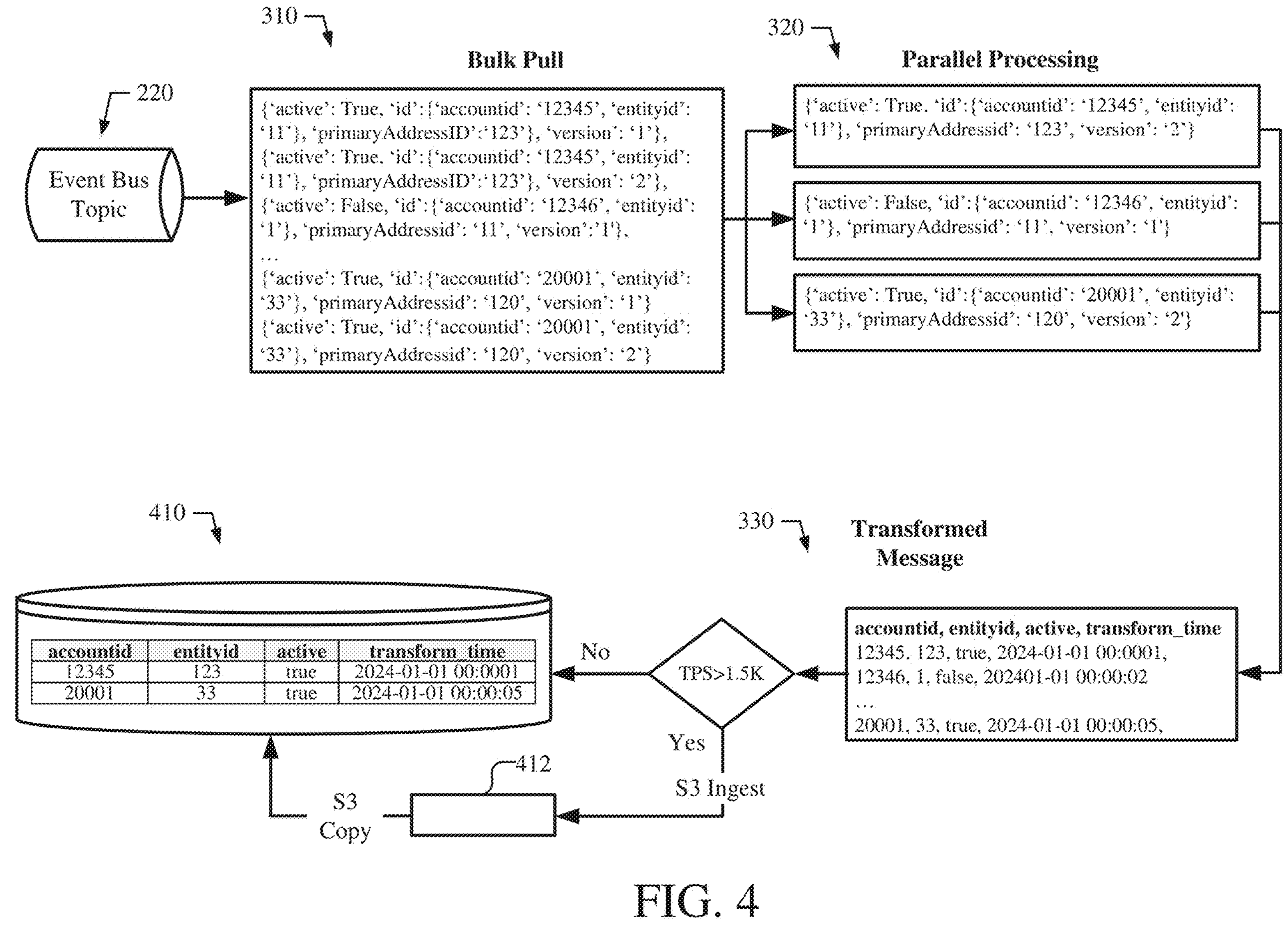
FIG. 4 shows a high-level overview of the ingestion process by the distributed ingestion service illustrated in FIG. 2.

FIG. 4, in another example, shows a high-level overview of the ingestion process by the distributed ingestion service 240, including deduplication, parallel processing and writing to local folders based on partition keys. FIG. 4 is similar to FIG. 3, illustrating a bulk pull 310, deduplication, and parallel processing 320 to generate a transformed message 330 that is written, based on partition key, to corresponding dedicated local folder in a distributed storage platform 410, which operates as network storage device 340 from FIG. 3. FIG. 4 illustrates a single Topic. As illustrated in FIG. 4, distributed ingestion service 240 employs field selection to eliminate "primaryAddressid" during the parallel processing to generate the transformed message so that only fields required for deriving the aggregates are selected and written to the storage. Additionally, the update/ingest time associated with each update may be included in the transformed message. Additionally, as illustrated, a JDBC connection may be used for topics with less than, e.g., 1.5 k TPS events and may utilize a copy feature 412, e.g., the Amazon S3 COPY, for topics with TPS of more than, e.g., 1.5 k (e.g., up to 10 k TPS) to enable parallel data insertion into the distributed storage platform 410.

To promote write efficiency, the distributed ingestion service 240 employes multiple processes to write data to the distributed database 250. For example, in a first process, discussed above, the data is consumed from the event bus Topic partitions continuously and written into the multiple local folders (per partition) on the network storage device, such as EBS storage, as illustrated in FIGS. 3 and 4. In a second process, the data is uploaded in a bulk import into the distributed database 250 partitioned based on primary keys. For example, as part of a second step in the first process, the data may be continuously read from the storage device and uploaded to blob storage. In the second process, the data is read from the blob storage and a bulk import is used to write the data to the distributed database 250 partitioned based on primary keys.

Figure 5:
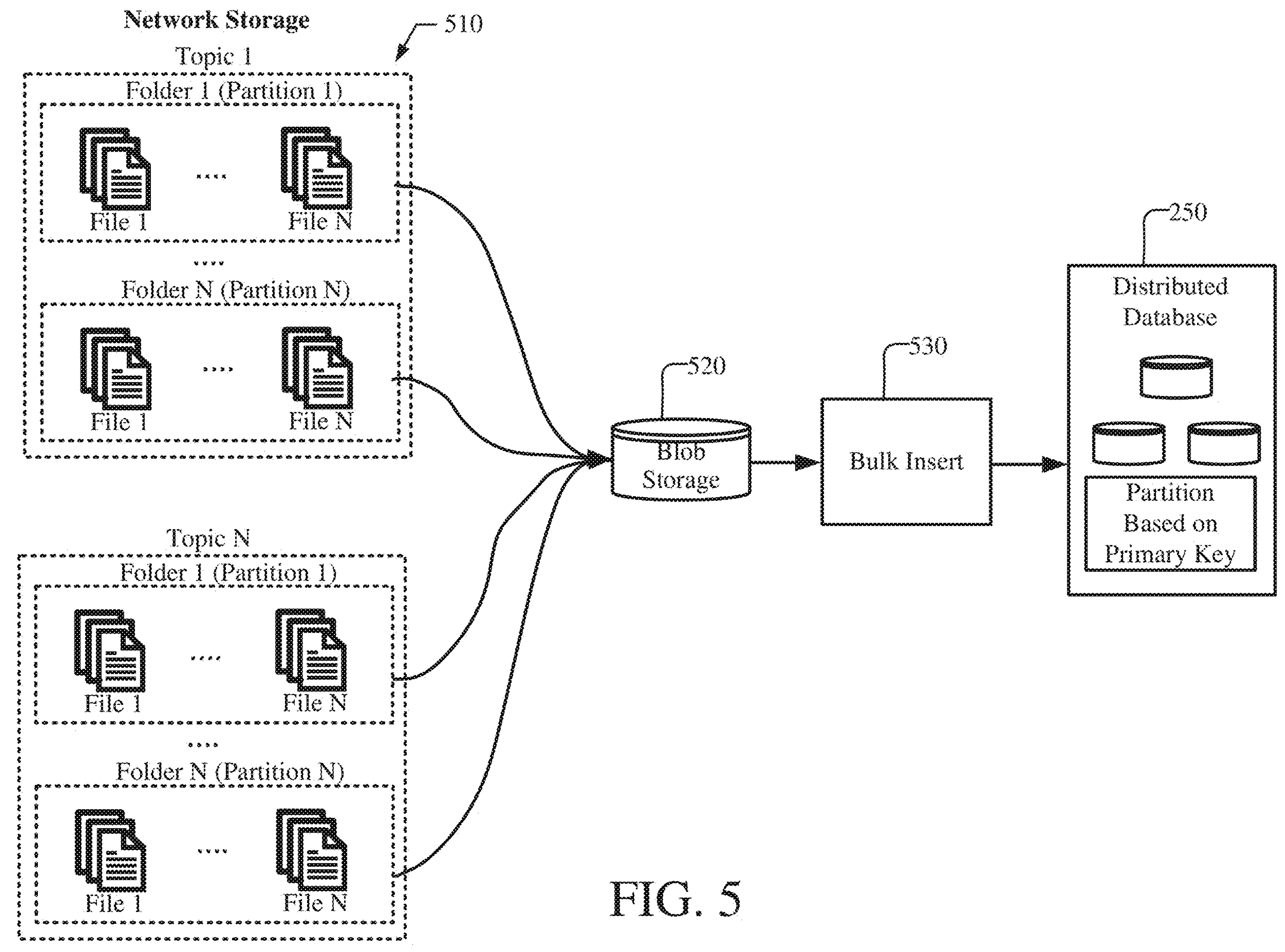
FIG. 5 shows a high-level overview of the ingestion process by the distributed ingestion service illustrated in FIG. 2.

FIG. 5 shows a high-level overview of the ingestion process by the distributed ingestion service 240, including the uploading of data to blob storage and bulk insertion to the distributed database 250. For example, while data is written to multiple local folders (per partition) in the first process, the data is continuously read from the storage device 510 and uploaded to blob storage 520, such as Amazon Simple Storage Service (S3) storage. In the second process, the data is read from the blob storage 520 and is bulk imported 530 into the distributed database 250 that is partitioned based on the primary keys.

With the multi-process approach illustrated in FIGS. 3/4 and FIG. 5, a large number of domain events may be ingested per second, e.g., 20 k messages per second. The bulk import is performed in parallel for multiple Topics and their corresponding multiple partitions, and accordingly, the overall write throughput is increased significantly relative to conventional systems. The bulk ingested data is appended and committed to the distributed database 250. The data written to the distributed database 250 need not be merged, because one primary key may have multiple versions of data, and on the "read side," some of the data may be filtered out during aggregate computation.

The distributed query service 260, shown in FIG. 2, executes the read queries by reading the data based on primary keys from the distributed database 250 to determine and publish the real-time aggregates from the data in response to user queries provided via the query platform 270. The distributed query service 260, for example, determines attribute aggregations only for updated events, fetches only limited data, and determines all attribute aggregations in one process.

In some implementations, while executing the read queries, the distributed query service 260 filters the data based on primary key and any other user defined configuration, e.g., as provided via the query platform 270, before determining the aggregate and publishing the data. With the primary key partitioned in the distributed database 250, the lookups are efficient.

By way of example, Table 3 illustrates a set of data that may be stored in the distributed database 250, associated with primary keys, which include a combination of identifiers for hierarchical entities including a company identifier ("C"), and an entity identifier ("E"), which may be a customer or other entity associated with the company identifier. By way of illustration, Table 3 shows the primary key, e.g., combination of customer/entity identifiers, the attributes, and a time stamp for the ingest time.

TABLE 3

| STORED DATA |
| --- |
| C1 < E1> <Attributes> Jan 1st |
| C1 < E1> <Attributes> Aug 1st |
| C2 < E2> <Attributes> Mar 10th |
| C2 < E2> <Attributes> Apr 10th |
| C2 < E2> <Attributes> Aug 1st |
| C3 < E3> <Attributes> Mar 5th |
| C3 < E3> <Attributes> July 15th |
| C3 < E3> <Attributes> Jul 15th |

In some implementations, while executing the read queries, the distributed query service 260 may filter the data based on the primary key, and ingestion time and determine the attribute aggregations for the data corresponding to the primary keys that are updated within a user defined time, e.g., in the previous 5 minutes, previous day, previous month, etc., which may be configured via the query platform 270. For example, a query (Query1) may be defined by selecting the primary keys (e.g., C1<E1>, C2<E2>, and C3<E3>) that are updated within a defined amount of time. Based on the stored data from Table 3, the output data for Query1 is illustrated in Table 4, where August 1st is within the defined time, and other dates from Table 3 are outside the defined time.

TABLE 4

| QUERY1 OUTPUT DATA |
| --- |
| C1 < E1> <Attributes> Aug 1st |
| C2 < E2> <Attributes> Aug 1st |

In some implementations, for any primary key, the determined attribute aggregation is stored, e.g., in the distributed database 250, and only updated information is used to update the attribute aggregation. For example, all rows associated with a primary key that are updated may be fetched and used to update the attribute aggregation. The full attribute aggregation may be determined only once during the bootstrap process. Accordingly, all updated data from the selected primary key is read from the distributed database 250 and the real-time attribute aggregation is determined using the read data and the previously determined attribute aggregation. For example, a query (Query2) may be defined so that given the primary keys resulting from Query1, all data is fetched. Based on the stored data from Table 3 and the output data from Query1 illustrated in Table 4, the output data for Query2 is illustrated in Table 5. The attribute aggregation may be determined using the Query2 output data, along with the previously determined attribute aggregation.

TABLE 5

| QUERY2 OUTPUT DATA |
| --- |
| C1 < E1> <V1, . . . , Version1> Jan 1st |
| C1 < E1> < V2, . . . , Version2> Aug 1st |
| C2 < E2> < V1, . . . , Version1> Mar 10th |
| C2 < E2> < V2, . . . , Version2> Apr 10th |
| C2 < E2> < V3, . . . , Version3> Aug 1st |

In some implementations, for any primary key, only the previous version and the latest version of attribute values for selected primary keys may be read and used to update the attribute aggregations. For example, the real-time aggregates may be determined based on a difference between the previous version and the current version of the attribute values for the selected primary keys. Thus, only the previous version and the latest version of domain event attribute values are read, there is no need to fetch all versions of the attribute values, reducing the data to be read and increasing the query speed. For example, based on the output data illustrated in Table 5, an attribute aggregation for C1 (A1) may be recomputed as $A1=A1-V1+V2$, and the attribute aggregation for C2 (A2) may be recomputed as $A2=A2-V2+V3$.

Thus, the data is written to the distributed database 250 with the append only approach to improve write performance, and the distributed query service 260 performs filtering and deduplication while reading to obtain only the latest records, e.g., the current version, or the current version and the previous version, for computation of the attribute aggregation. For example, in some implementations, only current version may read, and if the current version is associated with a delete event, the data is ignored. The deduplication and deletion of records (e.g., older records or records with the latest domain event is "delete") may be performed periodically to improve the read and write performance. When older records are deleted, at least one version for a primary key may be retained, e.g., the latest version and the previous version, which increases the speed of the aggregate value computation across all entities associated with a company.

With the use of the stream processing architecture 200 illustrated in FIG. 2, it is possible to ingest millions of messages per second, while executing thousands of queries per second with low latency to compute and publish the derived attributes. Moreover, the development time to create joined derived asses is reduced from months to hours.

Figure 6:
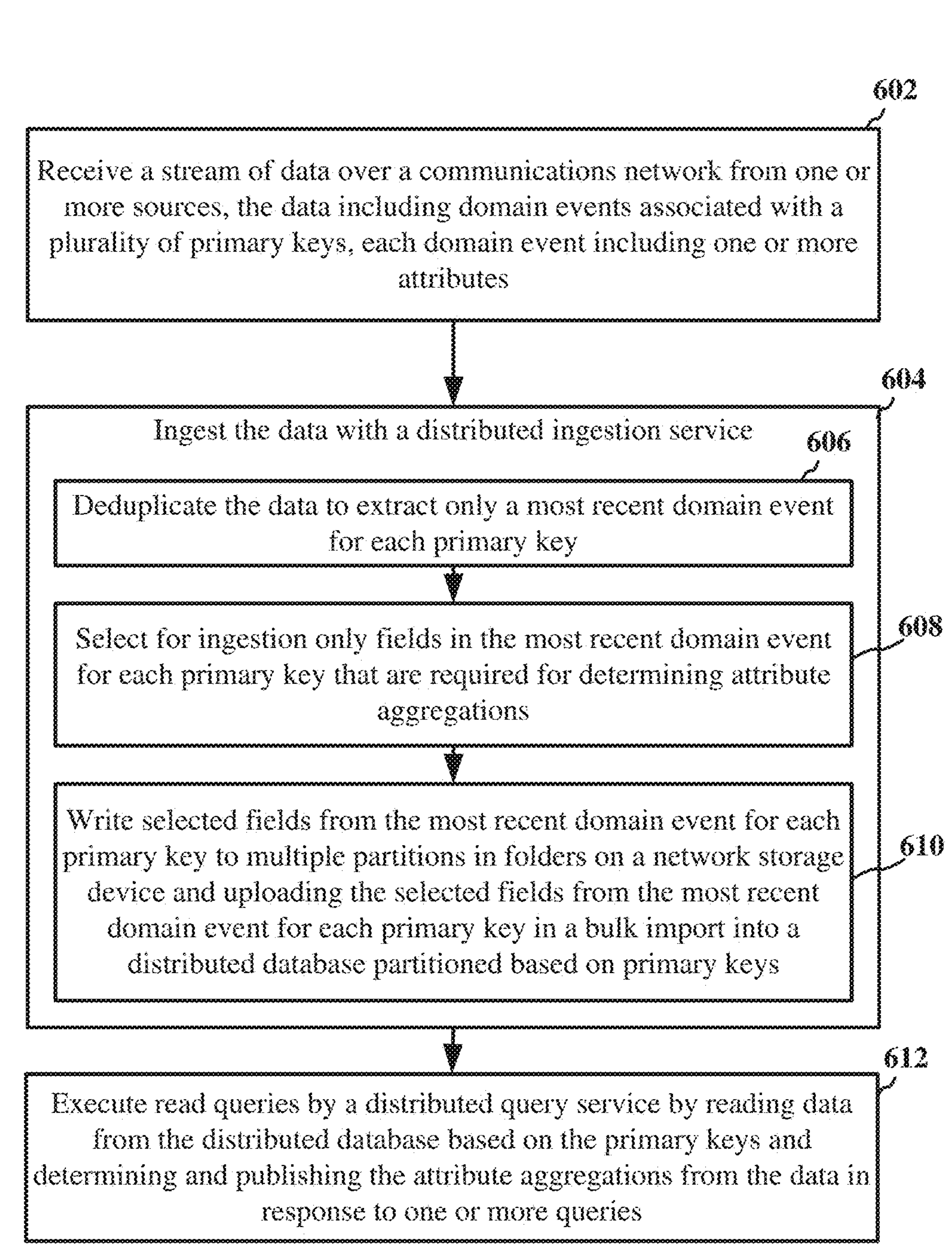
FIG. 6 shows an illustrative flowchart depicting an example method for determining attribute aggregations in a stream processing system, according to some implementations.

FIG. 6 shows an illustrative flowchart depicting an example method 600 for determining attribute aggregations in a stream processing system, as discussed herein. The method 600 is described as a computer-implemented method, e.g., performed by the system 100 illustrated in FIG. 1, which may employ the stream processing architecture 200 and process flow illustrated in FIGS. 2, 3, 4, and 5, according to some implementations. Various operations of method 600 may sometimes refer to one or more of FIGS. 1-5, for the sake of example, but it should be understood that operations are not specifically limited to the components referred and that other suitable components may be used to perform the various operations discussed herein.

At 602, the system 100 receives a stream of data over a communications network from one or more sources, the data including domain events associated with a plurality of primary keys, each domain event including one or more attributes, e.g., as discussed in relation to one or more sources 210, source event bus 220, and the distributed ingestion service 240 in FIG. 2 and in FIGS. 3 and 4.

At 604, the system 100 ingests the data with a distributed ingestion service, e.g., as discussed in relation to the distributed ingestion service 240 and distributed database 250 in FIG. 2 and in FIGS. 3, 4, and 5.

At 606, the ingestion of the data includes deduplicating the data to extract only a most recent domain event for each primary key, e.g., as discussed in relation to the deduplication process in the distributed ingestion service 240 in FIG. 2.

At 608, the ingestion of the data includes selecting for ingestion only fields in the most recent domain event for each primary key that are required for determining attribute aggregations, e.g., as discussed in relation to the field selection process in the distributed ingestion service 240 in FIG. 2.

At 610, the ingestion of the data includes writing selected fields from the most recent domain event for each primary key to multiple partitions in folders on a network storage device and uploading the selected fields from the most recent domain event for each primary key in a bulk import into a distributed database partitioned based on primary keys, e.g., as discussed in relation to the writing to local folders process in the distributed ingestion service 240 and distributed database 250 in FIG. 2, and in FIGS. 3, 4, and 5. In some implementations, uploading the selected fields from the most recent domain event for each primary key in a bulk import into a distributed database partitioned based on primary key may include uploading the selected fields from the most recent domain event for each primary key to blob storage and reading from blob storage and performing the bulk import into the distributed database, e.g., as discussed in relation to the writing to local folders process in the distributed ingestion service 240 and distributed database 250 in FIG. 5.

At 612, the system 100 executes read queries by a distributed query service by reading data from the distributed database based on the primary keys and determining and publishing the attribute aggregations from the data in response to one or more queries, e.g., as discussed in relation to the distributed database 250 and distributed query service 260 in FIG. 2.

In some implementations, each primary key may include a combination of identifiers for hierarchical entities, such as a combination of company identifier and entity identifier.

In some implementations, executing the read queries may include filtering the data based on an ingest time and determining the attribute aggregations for primary keys updated within a user defined amount of time.

In some implementations, executing the read queries may include reading from the distributed database all data for selected primary keys and determining the attribute aggregations based on all the data for the selected primary keys.

In some implementations, executing the read queries may include reading from the distributed database a previous version and a current version of attribute values for selected primary keys and determining the attribute aggregations based on a difference between the previous version and the current version of the attribute values for the selected primary keys.

In some implementations, executing the read queries may include deduplicating the data when multiple versions of attribute values are present to extract only a most recent attribute value for each primary key.

Figure 7:
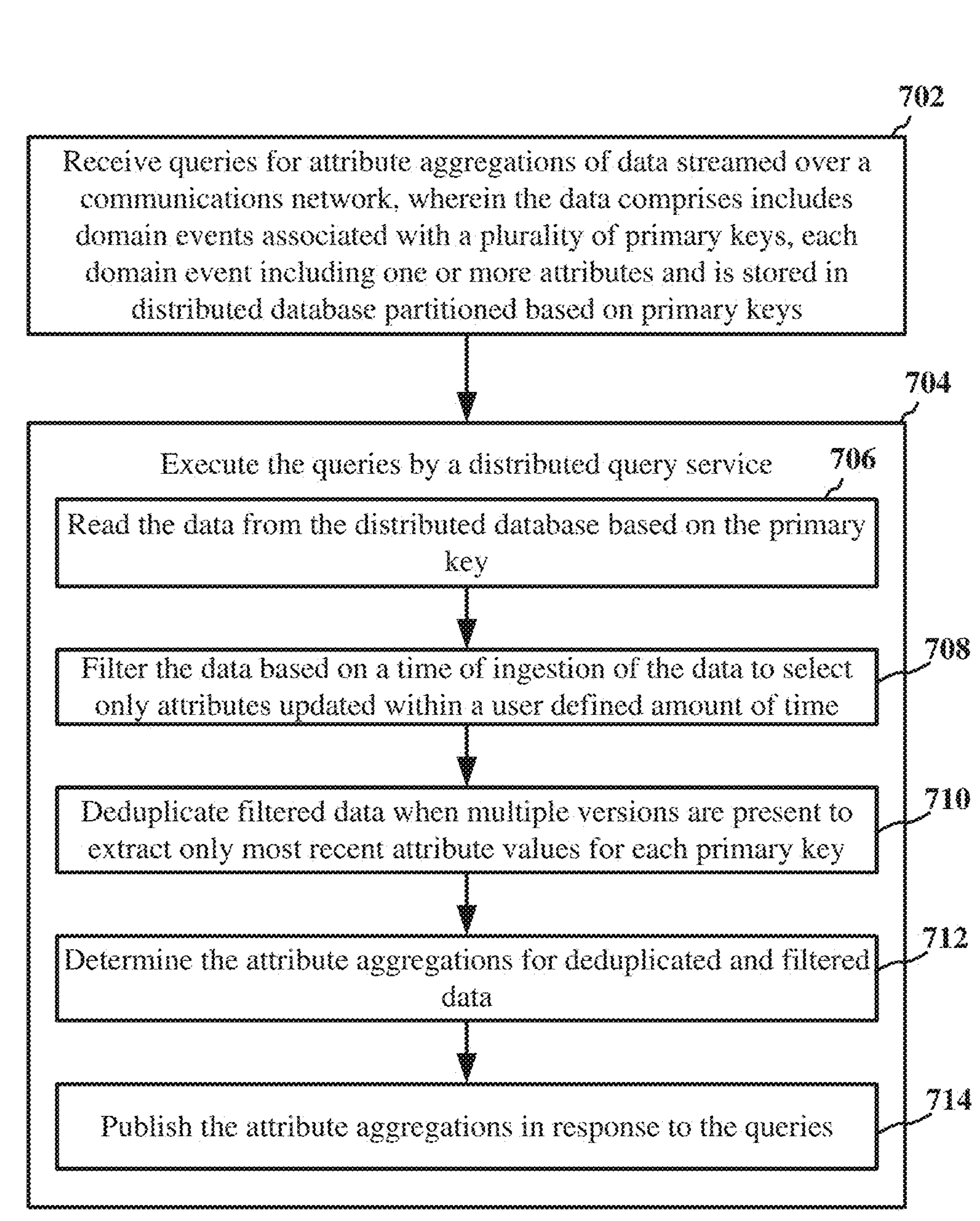
FIG. 7 shows an illustrative flowchart depicting an example method for determining attribute aggregations in a stream processing system, according to some implementations.

FIG. 7 shows an illustrative flowchart depicting an example method 700 for determining attribute aggregations in a stream processing system, as discussed herein. The method 700 is described as a computer-implemented method, e.g., performed by the system 100 illustrated in FIG. 1, which may employ the stream processing architecture 200 and process flow illustrated in FIGS. 2, 3, 4, and 5, according to some implementations. Various operations of method 700 may sometimes refer to one or more of FIGS. 1-5, for the sake of example, but it should be understood that operations are not specifically limited to the components referred and that other suitable components may be used to perform the various operations discussed herein.

At 702, the system 100 receives queries for attribute aggregations of data streamed over a communications network, wherein the data includes domain events associated with a plurality of primary keys, each domain event includes one or more attributes and is stored in distributed database partitioned based on primary keys, e.g., as discussed in relation to the query platform and distributed query service 260 in FIG. 2.

At 704, the system 100 executes the queries by a distributed query service, e.g., as discussed in relation to the query platform and distributed query service 260 in FIG. 2.

At 706, the execution of the queries includes reading the data from the distributed database based on the primary key, e.g., as discussed in relation to the read process in the distributed query service 260 in FIG. 2.

At 708, the execution of the queries includes filtering the data based on a time of ingestion of the data to select only attributes updated within a user defined amount of time, e.g., as discussed in relation to the filter process in the distributed query service 260 in FIG. 2.

At 710, the execution of the queries includes deduplicating filtered data when multiple versions are present to extract only most recent attribute values for each primary key, e.g., as discussed in relation to the deduplication process in the distributed query service 260 in FIG. 2.

At 712, the execution of the queries includes determining the attribute aggregations for deduplicated and filtered data, e.g., as discussed in relation to the aggregation process in the distributed query service 260 in FIG. 2.

At 714, the execution of the queries includes publishing the attribute aggregations in response to the queries, e.g., as discussed in relation to the publishing process in the distributed query service 260 in FIG. 2.

In some implementations, each primary key may include a combination of identifiers for hierarchical entities, such as a combination of company identifier and entity identifier.

In some implementations, reading the data includes reading all the data for selected primary keys, and the attribute aggregations are determined based on all the data for the selected primary keys.

In some implementations, reading the data includes reading a previous version and a current version of attribute values for selected primary keys and the attribute aggregations are determined based on a difference between the previous version and the current version of the attribute values for the selected primary keys.

In some implementations, the queries for attribute aggregations are received from a low-code, no-code query platform, e.g., as discussed in relation to the query platform and distributed query service 260 in FIG. 2.

In some implementations, the method may further include the system 100 ingesting the data streamed over the communications network with a distributed ingestion service, e.g., as discussed in relation to the distributed ingestion service 240 and distributed database 250 in FIG. 2 and in FIGS. 3, 4, and 5. The ingestion of the data includes deduplicating the data to extract only a most recent domain event for each primary key, e.g., as discussed in relation to the deduplication process in the distributed ingestion service 240 in FIG. 2. The ingestion of the data includes selecting for ingestion only fields in the most recent domain event for each primary key that are required for determining attribute aggregations, e.g., as discussed in relation to the field selection process in the distributed ingestion service 240 in FIG. 2. The ingestion of the data includes writing selected fields from the most recent domain event for each primary key to multiple partitions in folders on a network storage device and uploading the selected fields from the most recent domain event for each primary key in a bulk import into a distributed database partitioned based on primary keys, e.g., as discussed in relation to the writing to local folders process in the distributed ingestion service 240 and distributed database 250 in FIG. 2, and in FIGS. 3, 4, and 5. In some implementations, uploading the selected fields from the most recent domain event for each primary key in a bulk import into a distributed database partitioned based on primary key may include uploading the selected fields from the most recent domain event for each primary key to blob storage and reading from blob storage and performing the bulk import into the distributed database, e.g., as discussed in relation to the writing to local folders process in the distributed ingestion service 240 and distributed database 250 in FIG. 5.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other suitable configuration. In some implementations, particular processes and methods are performed by circuitry specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification can also be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations in performing aspects of the present disclosure, one or more operations may be performed in any order or concurrently to perform the described aspects of the disclosure. In addition, or in the alternative, a depicted operation may be split into multiple operations, or multiple operations that are depicted may be combined into a single operation. Thus, the claims are not intended to be limited to the implementations shown herein but are to be accorded the widest scope consistent with this disclosure and the principles and novel features disclosed herein.

What is claimed is:

1. A method for determining attribute aggregations in a stream processing system, the method comprising:

receiving a stream of data over a communications network from one or more sources, the data comprising domain events associated with a plurality of primary keys, each domain event comprising one or more attributes;

ingesting the data with a distributed ingestion service, wherein ingesting the data comprises:

deduplicating the data to extract only a most recent domain event for each primary key;

selecting for ingestion only fields in the most recent domain event for each primary key that are required for determining attribute aggregations; and writing selected fields from the most recent domain event for each primary key to multiple partitions in folders on a network storage device and uploading the selected fields from the most recent domain event for each primary key in a bulk import into a distributed database partitioned based on primary keys; and executing read queries by a distributed query service by reading data from the distributed database based on the primary keys and determining and publishing the attribute aggregations from the data in response to one or more queries.

2. The method of claim 1, wherein each primary key comprises a combination of identifiers for hierarchical entities.

3. The method of claim 1, wherein uploading the selected fields from the most recent domain event for each primary key in a bulk import into a distributed database partitioned based on primary key comprises uploading the selected fields from the most recent domain event for each primary key to blob storage and reading from blob storage and performing the bulk import into the distributed database.

4. The method of claim 1, wherein executing the read queries comprises filtering the data based on an ingest time and determining the attribute aggregations for primary keys updated within a user defined amount of time.

5. The method of claim 1, wherein executing the read queries comprises reading from the distributed database all data for selected primary keys and determining the attribute aggregations based on all the data for the selected primary keys.

6. The method of claim 1, wherein executing the read queries comprises reading from the distributed database a previous version and a current version of attribute values for selected primary keys and determining the attribute aggregations based on a difference between the previous version and the current version of the attribute values for the selected primary keys.

7. The method of claim 1, wherein executing the read queries comprises deduplicating the data when multiple versions of attribute values are present to extract only a most recent attribute value for each primary key.

8. A system for determining attribute aggregations, comprising:

one or more processors; and at least one memory coupled to the one or more processors and storing instructions that, when executed by the one or more processors, cause the system to perform operations comprising:

receiving a stream of data over a communications network from one or more sources, the data comprising domain events associated with a plurality of primary keys, each domain event comprising one or more attributes;

ingesting the data with a distributed ingestion service, wherein ingesting the data comprises:

deduplicating the data to extract only a most recent domain event for each primary key;

selecting for ingestion only fields in the most recent domain event for each primary key that are required for determining attribute aggregations; and writing selected fields from the most recent domain event for each primary key to multiple partitions in folders on a network storage device and uploading the selected fields from the most recent domain event for each primary key in a bulk import into a distributed database partitioned based on primary keys; and executing read queries by a distributed query service by reading data from the distributed database based on the primary keys and determining and publishing the attribute aggregations from the data in response to one or more queries.

9. The system of claim 8, wherein each primary key comprises a combination of identifiers for hierarchical entities.

10. The system of claim 8, wherein the system performs uploading the selected fields from the most recent domain event for each primary key in a bulk import into a distributed database partitioned based on primary key by being caused to perform operations comprising uploading the selected fields from the most recent domain event for each primary key to blob storage and reading from blob storage and performing the bulk import into the distributed database.

11. The system of claim 8, wherein the system performs executing the read queries by being caused to perform operations comprising filtering the data based on an ingest time and determining the attribute aggregations for primary keys updated within a user defined amount of time.

12. The system of claim 8, wherein the system performs executing the read queries by being caused to perform operations comprising reading from the distributed database all data for selected primary keys and determining the attribute aggregations based on all the data for the selected primary keys.

13. The system of claim 8, wherein the system performs executing the read queries by being caused to perform operations comprising reading from the distributed database a previous version and a current version of attribute values for selected primary keys and determining the attribute aggregations based on a difference between the previous version and the current version of the attribute values for the selected primary keys.

14. The system of claim 8, wherein the system performs executing the read queries by being caused to perform operations comprising deduplicating the data when multiple versions of attribute values are present to extract only a most recent attribute value for each primary key.

15. A method for determining attribute aggregations in a stream processing system, the method comprising:

receiving queries for attribute aggregations of data streamed over a communications network, wherein the data comprises domain events associated with a plurality of primary keys, each domain event comprising one or more attributes and is stored in distributed database partitioned based on primary keys; and executing the queries by a distributed query service comprising:

reading the data from the distributed database based on the primary key;

filtering the data based on a time of ingestion of the data to select only attributes updated within a user defined amount of time;

deduplicating filtered data when multiple versions are present to extract only most recent attribute values for each primary key;

determining the attribute aggregations for deduplicated and filtered data; and publishing the attribute aggregations in response to the queries.

16. The method of claim 15, wherein each primary key comprises a combination of identifiers for hierarchical entities.

17. The method of claim 15, wherein reading the data comprises reading all the data for selected primary keys, wherein determining the attribute aggregations is based on all the data for the selected primary keys.

18. The method of claim 15, wherein reading the data comprises reading a previous version and a current version of attribute values for selected primary keys and determining the attribute aggregations is based on a difference between the previous version and the current version of the attribute values for the selected primary keys.

19. The method of claim 15, wherein the queries for attribute aggregations are received from a low-code, no-code query platform.

20. The method of claim 15, further comprising:

ingesting the data streamed over the communications network with a distributed ingestion service, wherein ingesting the data comprises:

deduplicating the data to extract only a most recent domain event for each primary key;

selecting for ingestion only fields in the most recent domain event for each primary key that are required for determining the attribute aggregations; and writing selected fields from the most recent domain event for each primary key to multiple partitions in folders a network storage device and uploading the selected fields from the most recent domain event for each primary key in a bulk import into the distributed database partitioned based on the primary keys.

21. The method of claim 20, wherein uploading the selected fields from the most recent domain event for each primary key in a bulk import into the distributed database partitioned based on primary key comprises uploading the selected fields from the most recent domain event for each primary key to blob storage and reading from blob storage and performing the bulk import into the distributed database.

22. A system for determining attribute aggregations, comprising:

one or more processors; and at least one memory coupled to the one or more processors and storing instructions that, when executed by the one or more processors, cause the system to perform operations comprising:

receiving queries for attribute aggregations of data streamed over a communications network, wherein the data comprises domain events associated with a plurality of primary keys, each domain event comprising one or more attributes and is stored in distributed database partitioned based on primary keys; and executing the queries by a distributed query service comprising:

reading the data from the distributed database based on the primary key;

filtering the data based on a time of ingestion of the data to select only attributes updated within a user defined amount of time;

deduplicating filtered data when multiple versions are present to extract only most recent attribute values for each primary key;

determining the attribute aggregations for deduplicated and filtered data; and publishing the attribute aggregations in response to the queries.

23. The system of claim 22, wherein each primary key comprises a combination of identifiers for hierarchical entities.

24. The system of claim 22, wherein the system performs reading the data by being caused to perform operations comprising reading all the data for selected primary keys, wherein determining the attribute aggregations is based on all the data for the selected primary keys.

25. The system of claim 22, wherein the system performs reading the data by being caused to perform operations comprising reading a previous version and a current version of attribute values for selected primary keys and determining the attribute aggregations is based on a difference between the previous version and the current version of the attribute values for the selected primary keys.

26. The system of claim 22, wherein the queries for attribute aggregations are received from a low-code, no-code query platform.

27. The system of claim 22, wherein the system is further caused to perform operations comprising:

ingesting the data streamed over the communications network with a distributed ingestion service, wherein ingesting the data comprises:

deduplicating the data to extract only a most recent domain event for each primary key;

selecting for ingestion only fields in the most recent domain event for each primary key that are required for determining the attribute aggregations; and writing selected fields from the most recent domain event for each primary key to multiple partitions in folders a network storage device and uploading the selected fields from the most recent domain event for each primary key in a bulk import into the distributed database partitioned based on the primary keys.

28. The system of claim 27, wherein the system performs uploading the selected fields from the most recent domain event for each primary key in a bulk import into the distributed database partitioned based on primary key by being caused to perform operations comprising uploading the selected fields from the most recent domain event for each primary key to blob storage and reading from blob storage and performing the bulk import into the distributed database.

* * * * *